US012589985B2

(12) United States Patent
Meyer et al.

(10) Patent No.: US 12,589,985 B2
(45) Date of Patent: Mar. 31, 2026

(54) TANK FILLING EQUIPMENT

(71) Applicant: AKWEL, Champfromier (FR)

(72) Inventors: Geoffroy Meyer, Champfromier (FR);
Christophe Bondran, Campfromier
(FR)

(73) Assignee: AKWEL, Champfromier (FR)

( * ) Notice: Subject to any disclaimer, the term of this
patent is extended or adjusted under 35
U.S.C. 154(b) by 0 days.

(21) Appl. No.: 18/928,995

(22) Filed: Oct. 28, 2024

(65) Prior Publication Data

US 2025/0136429 A1 May 1, 2025

(30) Foreign Application Priority Data

Oct. 26, 2023 (FR) .................................. FR2311652

(51) Int. Cl.
*B67D 7/02* (2010.01)
*B60S 1/50* (2006.01)
(52) U.S. Cl.
CPC .............. *B67D 7/0288* (2013.01); *B60S 1/50*
(2013.01)
(58) Field of Classification Search
CPC .......................... B60S 1/50; B60K 2015/0464
See application file for complete search history.

(56) References Cited

U.S. PATENT DOCUMENTS 6,223,793 B1 * 5/2001 Donoughe ................ B60S 1/50
141/331
9,120,465 B2 * 9/2015 Uyanik ..................... B60S 1/50

9,725,074 B2 * 8/2017 Huebner .............. B62D 25/085
10,486,653 B2 * 11/2019 Hoeppel ................. B60S 1/481
2023/0331192 A1 * 10/2023 Ji ............................. B60S 1/50

FOREIGN PATENT DOCUMENTS

| CN | 219406395 U | 7/2023 |
| JP | H08-324390 A | 12/1996 |
| WO | 2009/095477 A1 | 8/2009 |

OTHER PUBLICATIONS

JP3897990B2 and machine translation (Year: 2025).*
JPH06127341A and machine translation (Year: 2025).*
Apr. 16, 2024 Search Report issued in French Patent Application
No. 2311652.
Apr. 16, 2024 Written Opinion issued in French Patent Application
No. 2311652.

* cited by examiner

*Primary Examiner* — Timothy P. Kelly
(74) *Attorney, Agent, or Firm* — Oliff PLC

(57) ABSTRACT

The equipment includes a tank having a filler neck extending
along a main axis and a member for filling the tank through
the neck. In particular, the member is configured so that it
can be mounted to slide inside the neck along the said axis
between a proximal position in which the neck is closed and
a distal position in which the tank can be filled from a
distance. The member includes a tubular body provided with
a closed distal end portion and a peripheral wall provided
with a filling mouth, the member being configured so that in
the proximal position the distal portion forms a cap for
sealing the neck and in the distal position the filling mouth
of the member is released from the neck to allow the
reservoir to be filled.

13 Claims, 10 Drawing Sheets

TANK FILLING EQUIPMENT

The present invention relates to the technical field of filling a tank for a motor vehicle. More particularly, but not exclusively, it relates to the field of fluid tanks for cleaning the glass surfaces of a motor vehicle.

In a manner known in the art, a motor vehicle is equipped with a system for wiping and washing the external surfaces of the vehicle's windows, and especially the vehicle's windscreen.

Such a wiping and washing system prevents the driver's view of the environment from being impaired, particularly when driving the vehicle in the rain or when the windscreen is cluttered with various types of grime, including dust, dirt, insects or other foreign bodies that could obscure the driver's view. In some cases, this system can also be used to defrost glass surfaces in cold weather.

Such a system may include one or more wiper blades, each of which is designed to scrape at least part of the outer surface of the window, especially to clear water from this surface.

In general, jets or spray nozzles are placed, for example, on a part of the vehicle bodywork near the window to be wiped or can be built into the windscreen wiper blades and are supplied with washing liquid known as windscreen washer fluid, via a circuit including, especially a pump and a system of pipes connected to a windscreen washer fluid tank, in order to spray the fluid onto the surface of the window.

Virtually all internal combustion vehicles are equipped with a windscreen wiper system with a fluid tank positioned under the bonnet, next to the engine components. This means that the filling mouth faces upwards, making it easier to fill the tank when it is empty.

However, in recent years, the fight against atmospheric pollution has led carmakers to develop mass-produced electric vehicles including an electric motor as the sole driving force, and in which a battery is mounted in the floor of the vehicle body, thereby freeing up the space traditionally occupied in the front bonnet by the engine block. The space thus freed up at the front of the electric vehicle can be used to form a boot, for example for luggage.

In order to meet the aesthetic and perceived quality requirements of electric vehicle users, some manufacturers have moved the tank filling mouth, traditionally accessible by opening the bonnet, to a side or front part of the vehicle bodywork and made it accessible by means of a hatch, which makes filling the tank much more difficult.

The result of this is complex tank constructions, formed by assembling a large number of parts to form a bulky, multi-component structure.

The aim of the present invention is to offer equipment for a motor vehicle for filling a liquid tank, the filling orifice of which is accessible from a part of the side or front bodywork, or more generally from the periphery, which is ergonomic and easy to use and which makes it possible to limit the risks of fluid leaking onto the bodywork during the filling operation while minimising the number of components.

DESCRIPTION OF THE INVENTION

The invention relates specifically to equipment for a motor vehicle comprising a tank provided with a filler neck extending along a main axis and a member for filling the tank via the neck, characterised in that the member is configured so as to be mounted such that it slides inside the neck along the said axis between a proximal position in which the neck is closed off and a distal position in which the tank can be filled from a distance, and in that the member comprises a body provided with a closed distal end portion and a peripheral wall provided with a filling mouth, the member being configured so that, in the proximal position, the distal portion forms a cap for closing the neck and, in the distal position, the filling mouth of the member is released from the neck to allow the tank to be filled.

With the invention, given that the filling mouth is clear in the distal position on a peripheral wall of the body of the filling member, filling the tank via the neck is simplified and can be done from a distance from a body wall when the neck of the tank opens onto a side or front wall of the motor vehicle.

Equipment according to the invention may further comprise one or more of the following characteristics.

In a preferred embodiment, with the main axis of the neck inclined upwards relative to a horizontal direction, the member is configured, at least in its distal position, to be able to tilt downwards relative to the main axis of the neck.

In a preferred embodiment, the equipment comprises means for quickly locking the member at the neck in the proximal position.

In a preferred embodiment, the locking means comprises a male element and a female element designed to fit into each other, the male and female elements being carried separately by external flanges connected to the neck and to the member.

In a preferred embodiment, the locking means being of the bayonet type, the member is pre-assembled at the neck by inserting the male element into the female element and then locked to the neck by rotation about the main axis.

In a preferred embodiment, the body has a generally longitudinally truncated cylindrical shape, for example a semi-cylindrical shape, with a flat surface on which the filling mouth is formed.

In a preferred embodiment, the neck and member are equipped with a locating device to force the hole to be positioned upwards when in use.

In a preferred embodiment, the locating device comprises an internal partition extending as a sideways projection into the interior of the neck and demarcating an insert-shaped cross-section complementary to a cross-section of the tubular member at a proximal end portion.

In a preferred embodiment, the internal wall of the neck further comprises at least one longitudinal rib along the main axis configured to prevent rotation of the member around the main axis.

In a preferred embodiment, the distal end wall comprises a circumferential groove for receiving an O-ring seal.

In a preferred embodiment, the sealing wall is in the form of a cap with a circumferential flange that demarcates elements for gripping and handling the cap.

In a preferred embodiment, a proximal end of the member is provided with an abutment designed to engage with an internal raised portion of the container to prevent the member from disengaging from the neck at the end of its sliding stroke towards the distal position.

In a preferred embodiment, the body of the member is produced by a one-piece moulding of synthetic material.

Another object of the invention is a motor vehicle comprising equipment according to the invention, characterised in that the filling equipment can be accessed from a hatch mounted on a peripheral body structure, for example on the side or front of the motor vehicle, so that this filling equipment can be accessed from the outside.

The invention will be better understood and its benefits will be clearer from the following detailed description of non-limiting examples. The description refers to the annexed drawings wherein.

Figure 7:
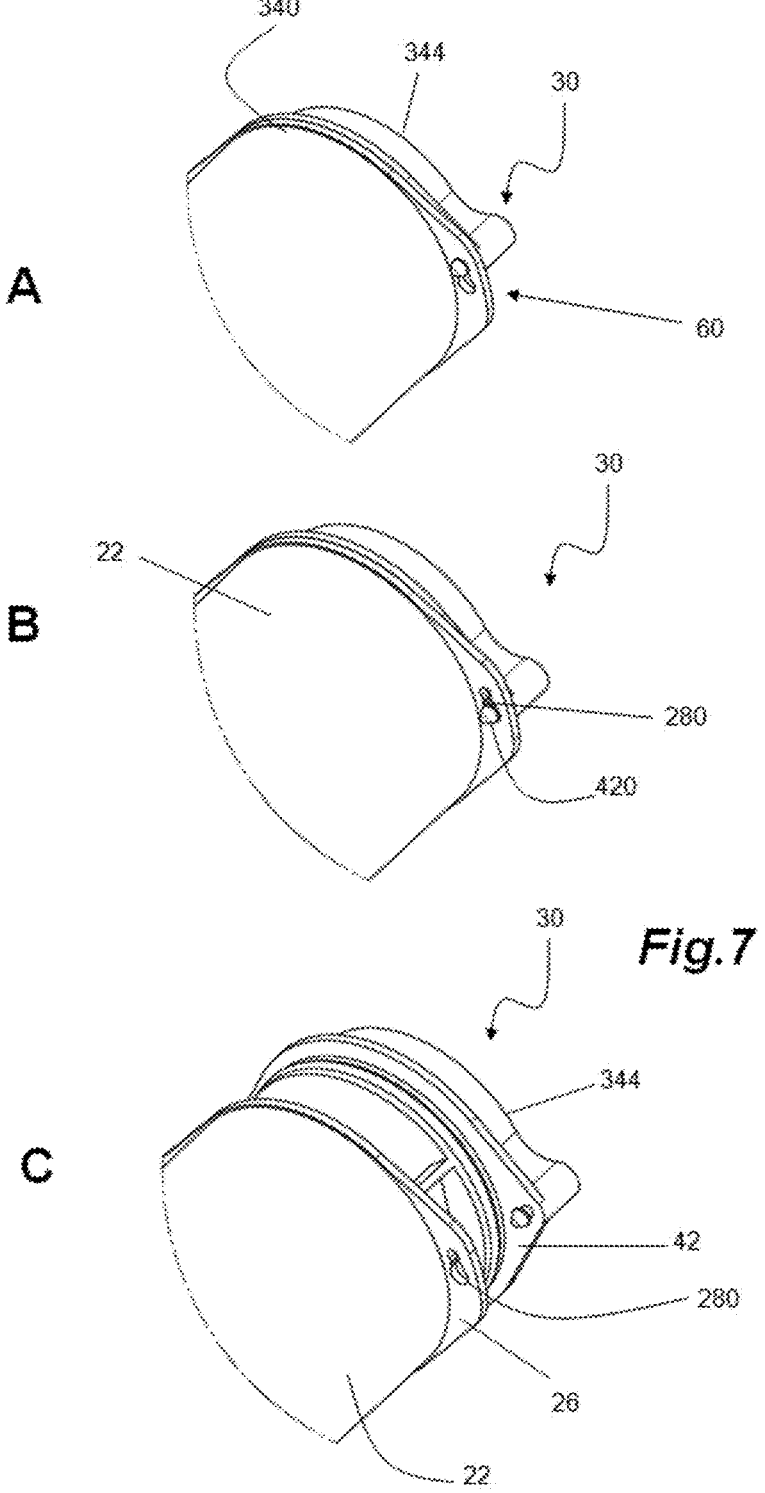

FIGS. 7A, 7B, and 7C show three views illustrating the different configurations of the connecting means (view A: filler alone; view B: unlocked, view C: released).

Figure 5:
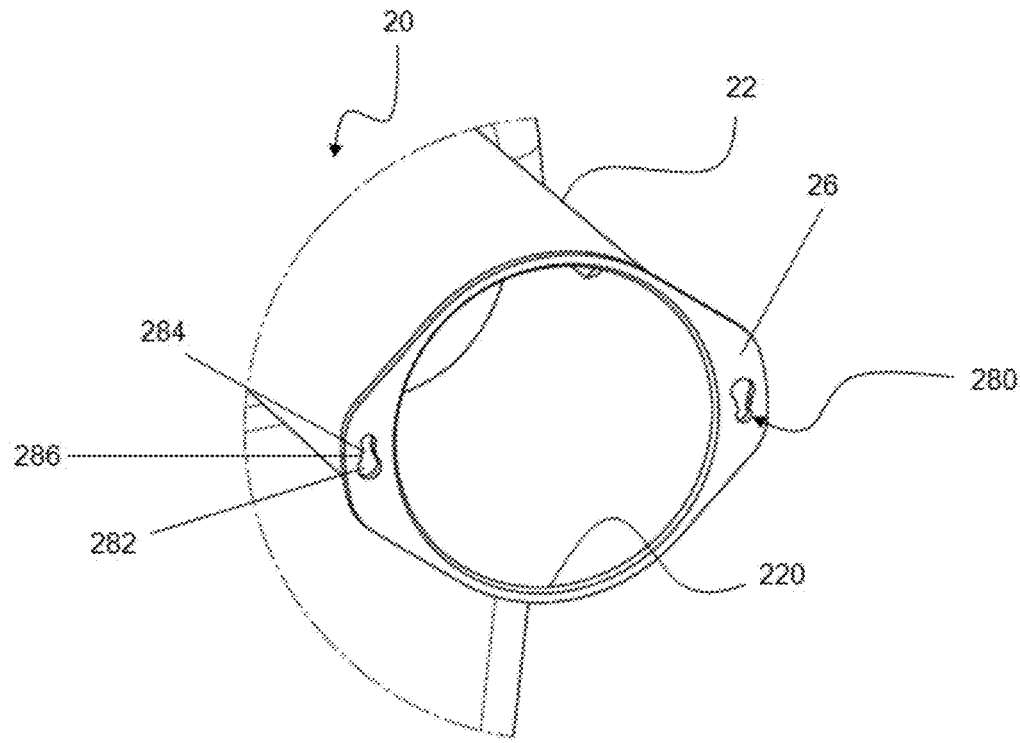
FIG. 5 shows an enlarged scale view of a filler neck of a tank of the equipment according to the invention.
Figure 6:
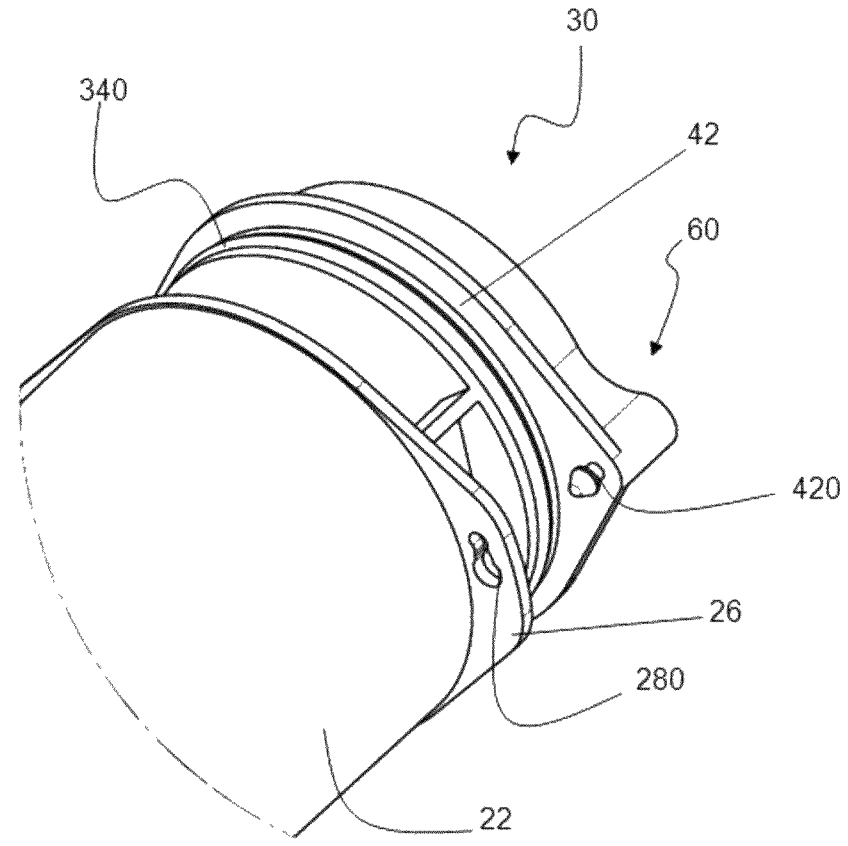
FIG. 6 shows an enlarged scale view of the means for connecting the neck and the member for filling the equipment according to the invention in a freed up configuration.
Figure 8:
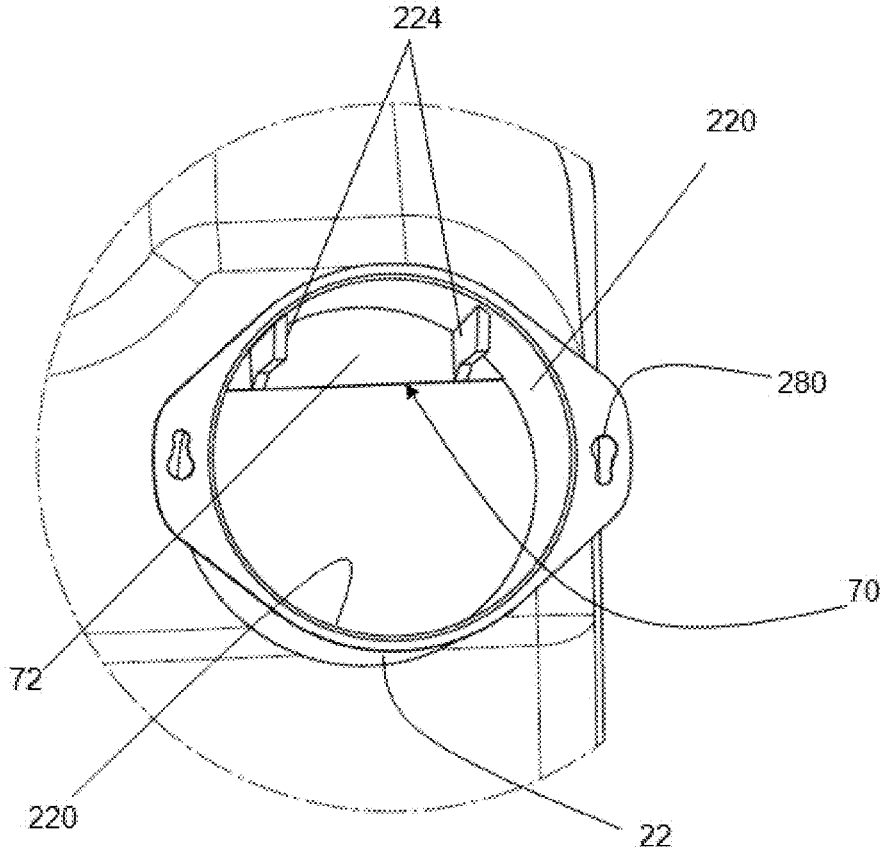

FIG. 8 shows a front view of the neck in FIG. 5.

Figure 9:
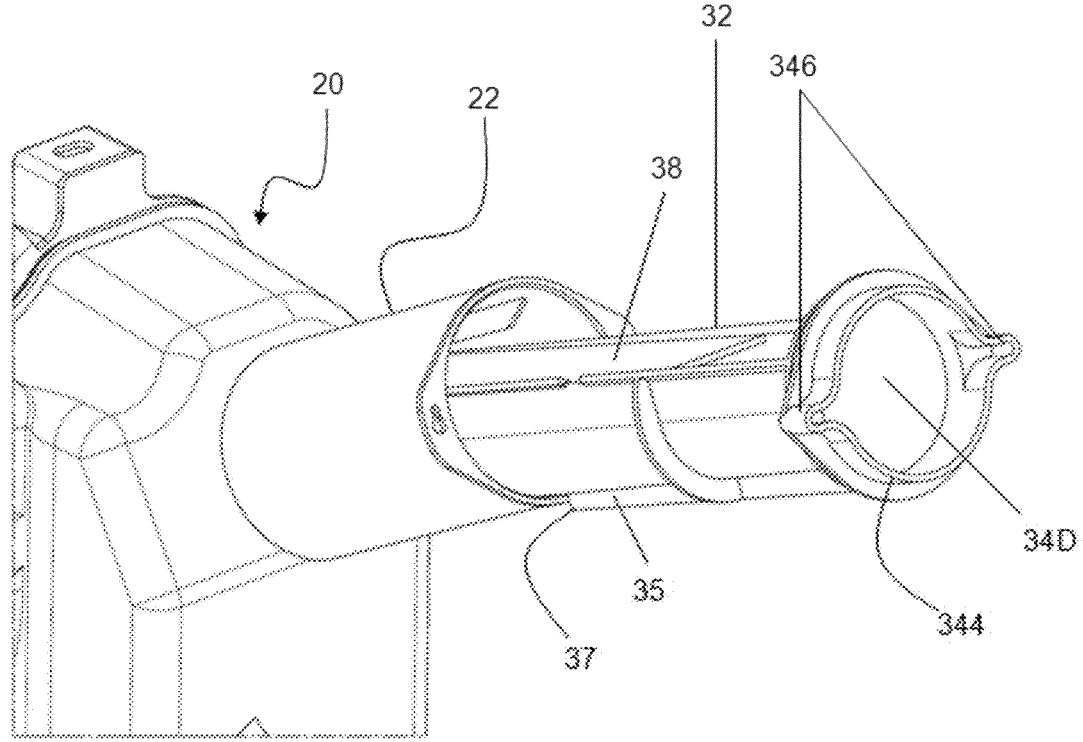

FIG. 9 shows a perspective view of the filling member in a tilted distal position relative to the neck.

Figure 10:
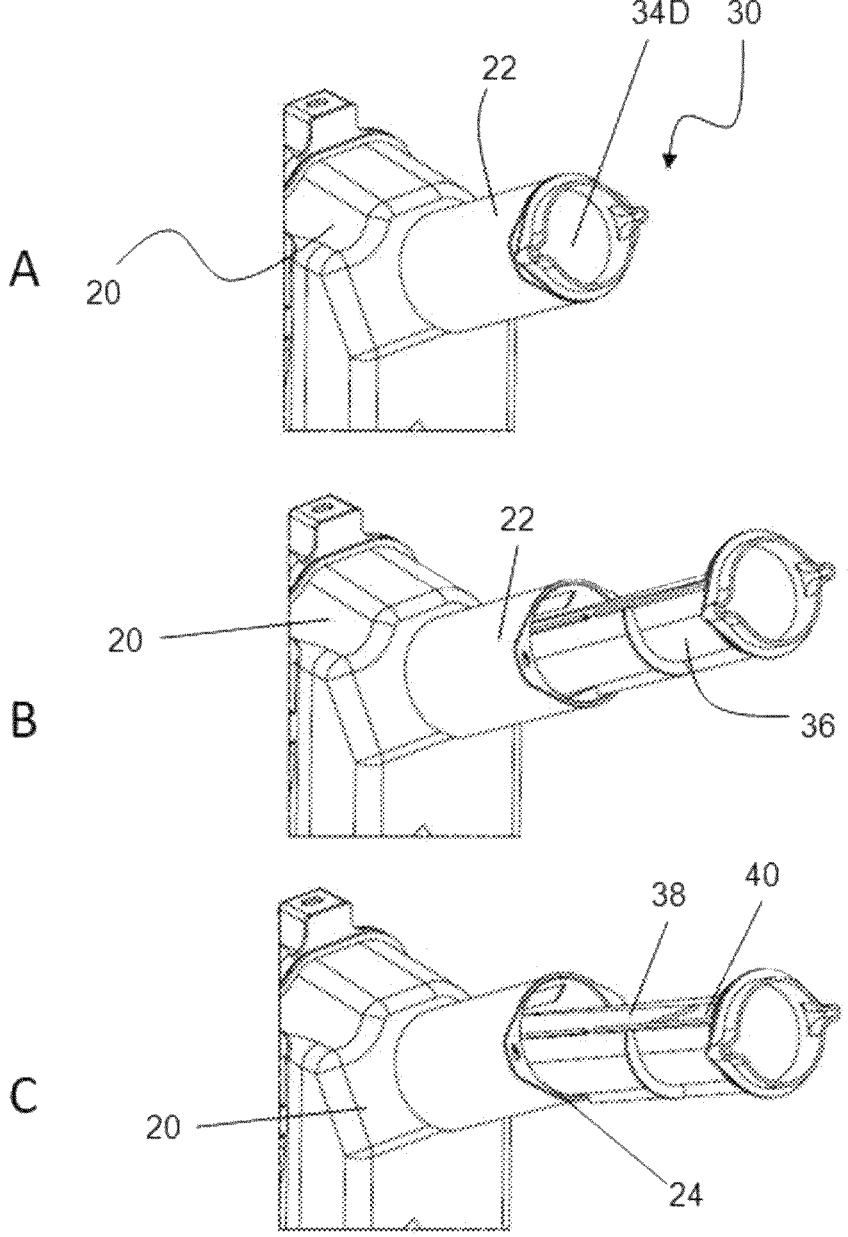

FIGS. 10A, 10B, and 10C show three views illustrating the various stages of operation of the equipment according to the invention.

DETAILED DESCRIPTION OF THE INVENTION

FIGS. 1 to 10C show an equipment for filling a vehicle tank. In the next part of the description, the equipment will be referred to by the general reference 10.

Figure 1:
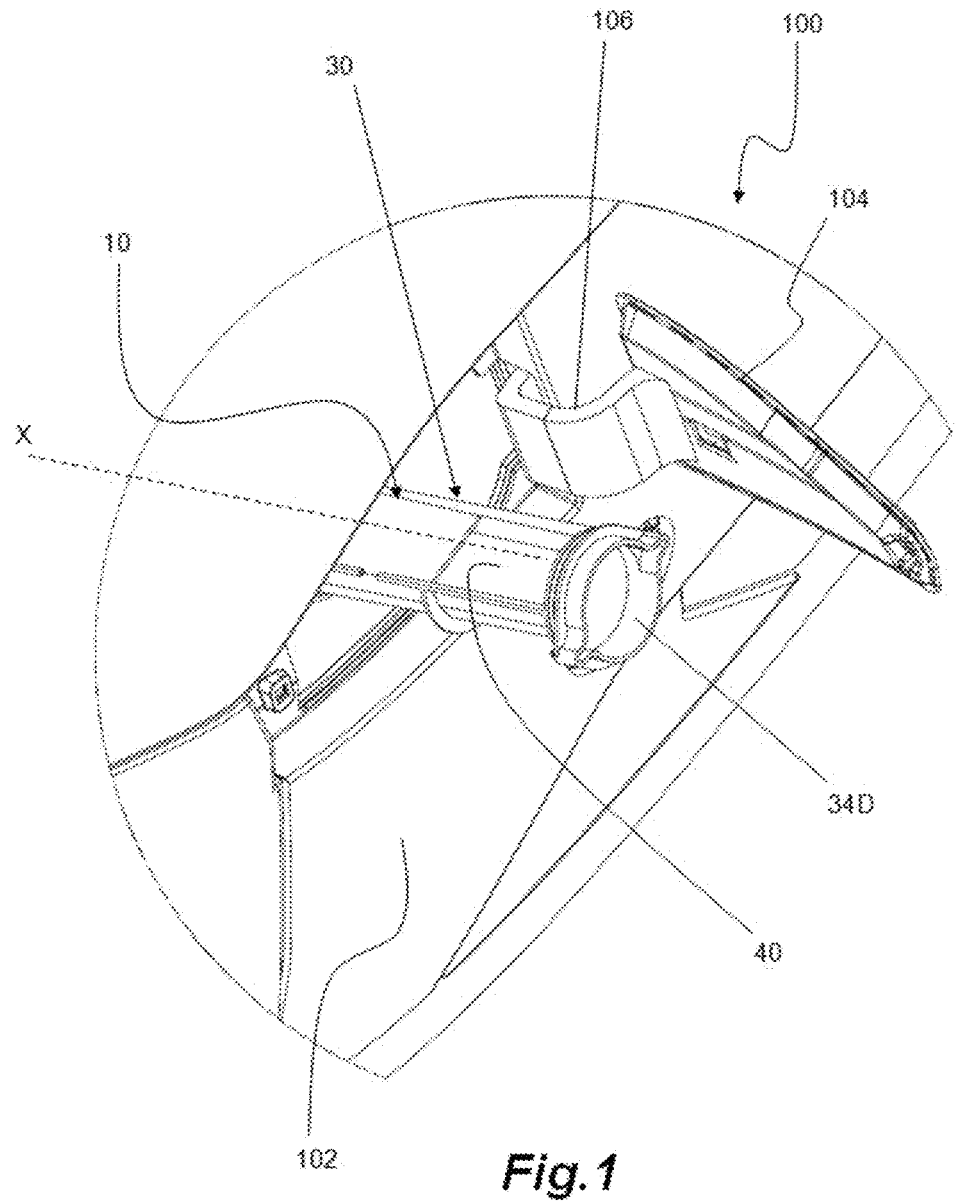
FIG. 1 is a partial perspective view of a hatch for a windscreen washer fluid tank of a motor vehicle comprising equipment according to the invention.

As illustrated in FIG. 1, this equipment 10 is designed to be fitted in a motor vehicle 100. Preferably, the filling equipment 10 is accessible from a hatch 104 mounted on a peripheral body structure 102, for example on the side or front of the motor vehicle 100, so that this filling equipment 10 can be accessed from the outside.

The filling liquid can be, for example, water or an alcohol-based anti-freeze liquid used to supply the nozzles.

FIG. 1 shows that the hatch 104 comprises a hinge 106 for swivelling the hatch to allow access to a location in which the filling equipment 10 is mounted.

In the next part of the description, the terms 'horizontal', 'vertical', 'upper', 'lower', 'top' and 'bottom' are used to describe elements used when the motor vehicle is operated on flat horizontal ground.

Figure 2:
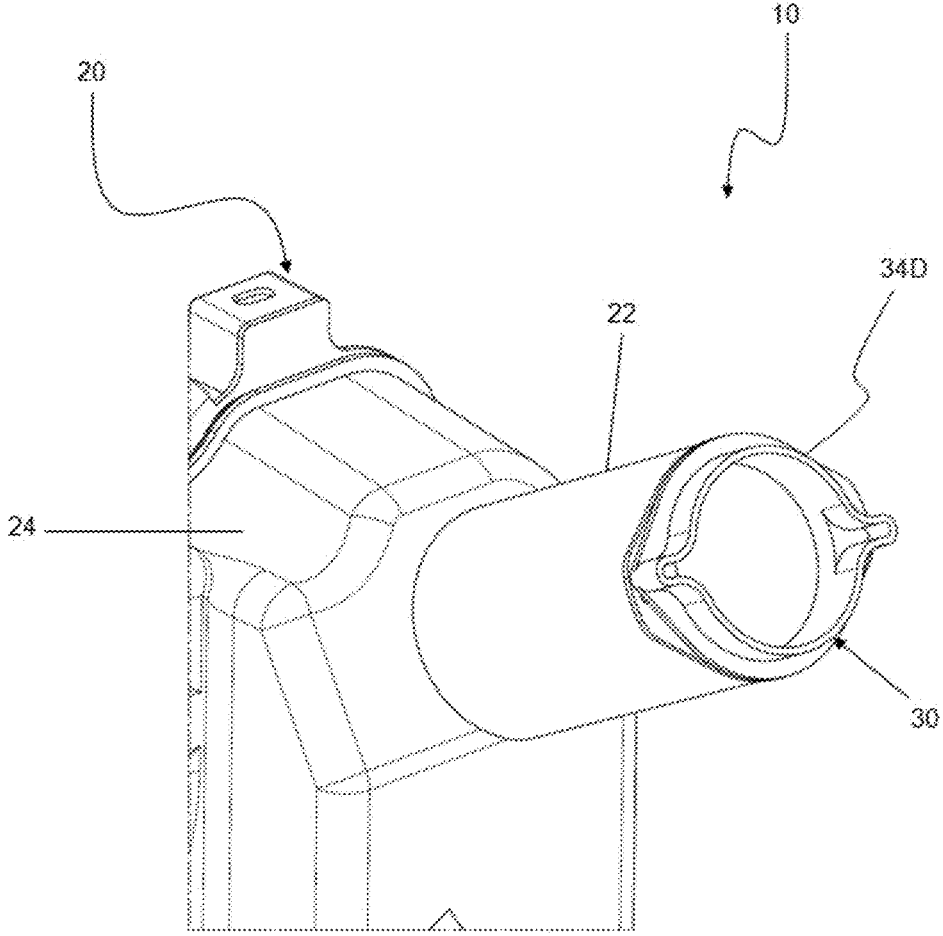
FIG. 2 is a perspective view of the equipment in FIG. 1 in a proximal obturation position.

According to the invention, the equipment 10 comprises a tank 20 comprising a tank body and a neck 22 for filling the body. This neck 22 has, for example, a generally tubular shape that extends longitudinally along a main axis X (see FIG. 3), preferably inclined upwards in a configuration mounted in the motor vehicle 100, as illustrated in FIG. 2. As illustrated, this neck 22 is provided with a filling mouth 24. The inclination of the neck 22 is preferably between 5 and 45 degrees relative to the horizontal plane, for example between 25 and 35 degrees.

Figure 3:
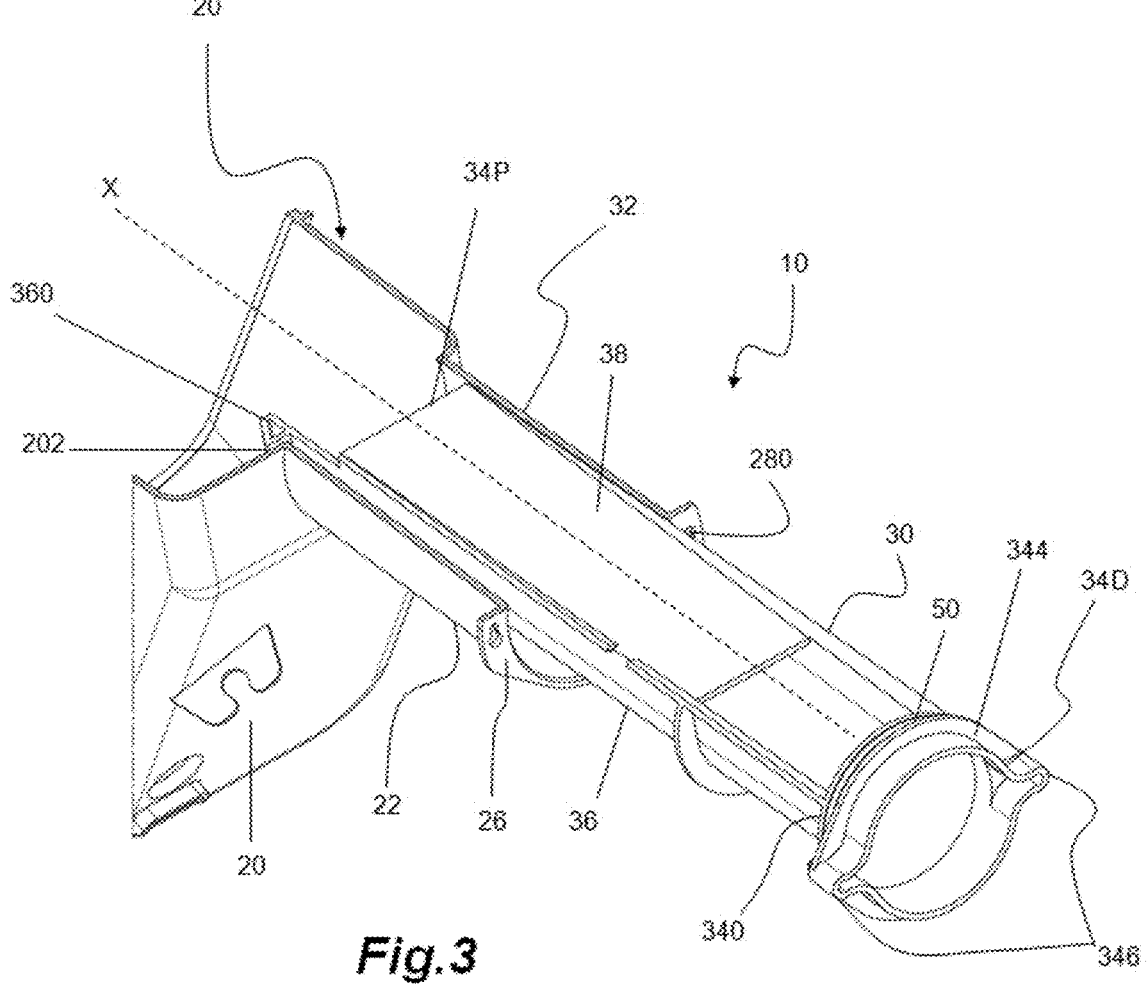
FIG. 3 is a cross-sectional view of the equipment in FIG. 1 in a distal filling position.

The equipment 10 also includes a member for filling 30 the tank 20 through the neck 22. As illustrated in FIG. 3, the member 30 is configured to slide inside the neck 22 along said axis X between a proximal position (FIG. 2) in which the neck 22 is closed and a distal position (FIG. 3) in which the tank 20 can be filled from a distance.

Preferably, the member 30 comprises a tubular body 32 having a closed distal end portion 34D and a peripheral wall 36 having a filling mouth 40.

For example, the body 32 has a generally longitudinally truncated cylindrical shape, for example a semi-cylindrical shape, with a flat surface 38 on which the filling mouth 40 is formed. Although not illustrated in the figures, the member 30 and the neck 22 may alternatively have a general shape that is not strictly tubular, but may on the contrary have any other general shape that allows them to complement each other in terms of shape so that they can slide relative to each other along the X axis.

Preferably, the distal wall 34D is in the form of a stopper with a cross-section generally in the shape of a solid disc.

In addition, the distal end wall 34D preferably comprises a circumferential groove 340 for receiving an O-ring seal 50. Overall, the distal end wall 34D may have, for example, a circumferential flange 344 demarcating elements 346 for gripping and handling the cap 34 and, more generally, the filler 30. These gripping elements 346 are in the form of diametrically opposed ears, for example.

When in use, the member 30 is configured so that, in the proximal position, the distal portion 34D forms a stopper for closing the neck 22 and, in the distal position, the filling mouth 40 of the member 30 is freed from the neck 22 to allow the tank 20 to be filled through this same mouth 40.

As the main axis X of the neck 22 is inclined upwards relative to a horizontal direction, the tubular member 30 is configured, at least in its distal position, to be able to tilt downwards relative to the main axis X of the neck 22.

The filling member 30 also comprises a downwardly projecting longitudinal rib 35, preferably located along a median line on the semi-cylindrical part 36 of the body 32, which allows the filler to be guided in the axial direction.

Thus, when the member 30 slides in the neck 22, the rib 35 of the member 30 defines a longitudinal bearing line against the internal wall 220 of the neck 22 in the axial direction, thereby axially guiding the member 30 into the neck 22. Preferably, rib 35 has a tilting notch 37 at a proximal end. When the notch 37 of the rib 35 passes through the orifice 24 during the sliding of the member 30 in the axial direction, the member 30 tilts downwards.

In a preferred embodiment illustrated in FIGS. 6, 7A, 7B, and 7C comprising a means 60 for quickly locking the member 30 to the neck 22 in the proximal position.

Preferably, the locking means 60 comprises a male element 420 and a female element 280 designed to fit into each other, the male element 420 and female element 280 being carried respectively by external flanges connected to the member 30 and to the neck 22. This locking means 60 is preferably removable, making it easier to lock and unlock the equipment 10.

Thus, the distal part 34D of the member 30 is equipped with a flange 42 carrying on its periphery at least one male element 420, for example shaped like a mushroom. In addition, the neck 22 comprises a flange 26 with a peripheral opening 280 for receiving the element 420. The male and female elements are designed to fit into each other by clipping, snapping or any other unlockable means.

Preferably, the locking means 60 is of the bayonet connection type, the member 30 is pre-assembled to the neck 22 by insertion of the projecting pin 420 into the opening 280 and then locked to the neck 22 by rotation about the main axis X. For example, as illustrated in FIG. 5, the orifice 280 has a wider portion 282 for insertion of the pin 420 and a narrower portion 284 connected together by a channel 286 resisting passage of the pin 420 between the two portions. For example, channel 286 comprises a constricted portion.

As illustrated in FIG. 8, the neck 22 and the member 30 are equipped with a locating device 70 to force the mouth to be positioned upwards when in use. For example, the locating device comprises an internal partition 72 projecting crosswise inside the neck 22 and demarcating a cross-section with an insertion shape complementary to a cross-section of the tubular member 30. The partition 72, for example, has the general shape of a truncated disc, for example centred on the X axis.

The inner wall 220 of the neck 22 further comprises at least one longitudinal rib 224 along the main axis X configured to prevent rotation of the member 30 about the main axis X. Preferably, as illustrated in FIG. 8, the inner wall 220 comprises two ribs 224 extending from the coder partition 72. These ribs 224 are positioned on either side of an axis for symmetry of the keying partition 72.

Figure 4:
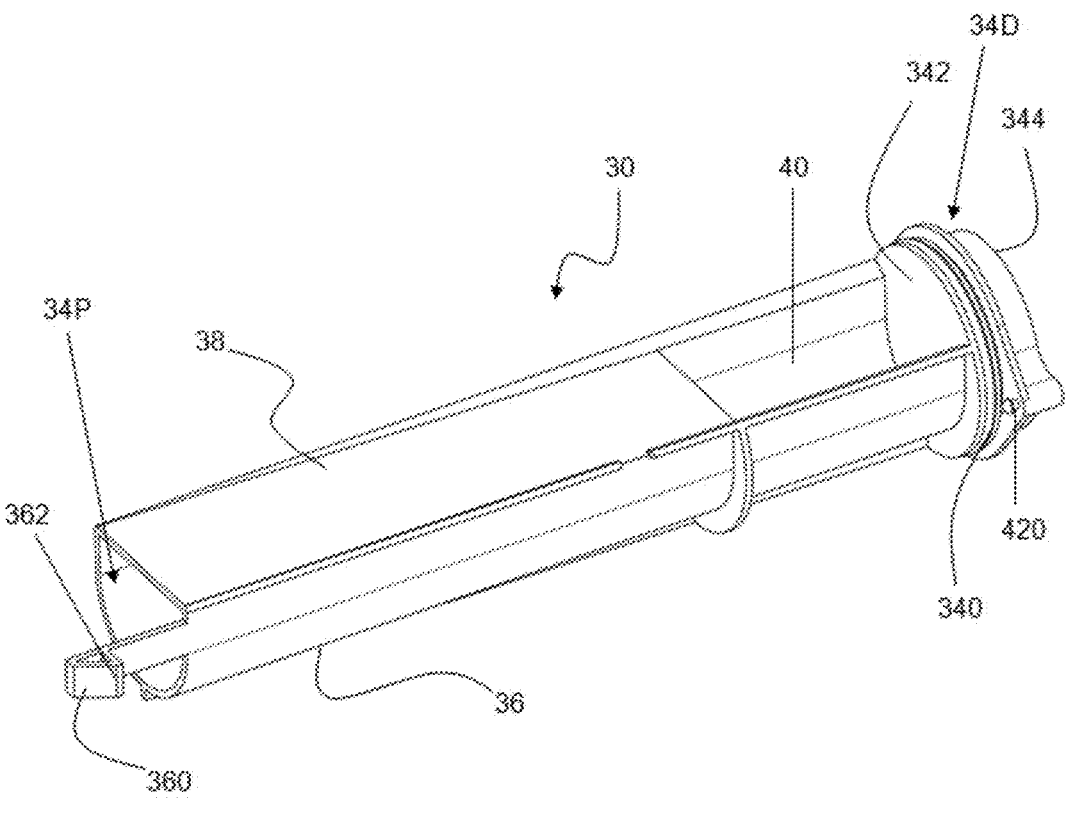
FIG. 4 is a perspective view of a member for filling the equipment according to the invention.

As shown in FIG. 4, the tubular member 30 is equipped, in a proximal end part 34P, with a stop 360 designed to fit into an internal raised portion 202 of the tank 20 to prevent the member from detaching from the neck 22 when it has finished sliding towards the distal position.

For example, the body 32 of the member 30 is moulded in one piece from synthetic material.

With reference to FIGS. 1 to 10C, the main aspects of how an equipment works according to the invention will now be described.

In the initial state, the equipment is in a closed configuration. The filling member cap seals the filling member in its proximal position. The bayonet connection means 60 are in a locked configuration, with the pin 420 housed in the narrowest part of the opening 280.

To fill the tank 20, the user opens the motor vehicle's hatch, which may be located on a side or front wall of the motor vehicle, which in the illustrated case, is the front wall.

Then, the user grips the collar on the member 30 to cause the member 30 to swivel inside the neck 22. In the illustrated example, the user senses a force to be exerted to cause the pin 420 to move inside the opening 280 and thereby unlock the means 60.

Once the filling member 30 is unlocked from the tank 20, the member is slid inside the neck 22 to a distal position along its longitudinal rib 35.

In this distal position, by means of the tilting notch 37, the filling member 30 can be tilted slightly in order to bring the inclination of the member 30 closer to a horizontal plane and thus facilitate filling through the mouth 40. Tilting also brings the notch 37 into contact with the outer face of the flange 26, creating a retention and preventing the member 30 from returning to the proximal position under its own weight.

Admittedly, the invention is not limited to the embodiments described above. Other embodiments known to a person skilled in the art may also be considered without departing from the scope of the invention defined in the following claims.

The invention claimed is:

1. A device for a motor vehicle, the device comprising:
   a tank provided with a filler neck extending along a main axis; and
   a member for filling the tank through the neck, wherein:
   the member is configured to be mounted to slide inside the neck along said axis between a proximal position for closing the neck and a distal position allowing the tank to be filled from a distance,
   the member comprises a body having a closed distal end portion and a peripheral wall having with a filling mouth,
   the member is configured so that, in the proximal position, the distal end portion forms a stopper for sealing the neck and, in the distal position, the filling mouth of the member is released from the neck to allow the tank to be filled, and
   the main axis of the neck is inclined upwards with respect to a horizontal direction, and the member is configured, at least in its distal position, to be able to tilt downwards relative to the main axis of the neck.

2. The device according to claim 1, comprising a means for quickly locking the member to the neck in the proximal position.

3. The device according to claim 2, wherein the locking means comprises a male element and a female element designed to fit into each other, the male and female elements being carried separately by external flanges connected to the neck and to the member.

4. The device according to claim 3, wherein the locking means being of the bayonet connection type, the member is pre-assembled to the neck by inserting the male element into the female element and then locked to the neck by rotation around the main axis.

5. The device according to claim 1, wherein the body has a generally longitudinally truncated cylindrical shape having a flat face on which the filling mouth is positioned.

6. The device according to claim 1, wherein the neck and the member are provided with a locating device to force the filling mouth to be positioned upwards when in use.

7. The device according to claim 6, wherein the locating device comprises an internal partition projecting crosswise inside the neck and demarcating a cross-section with an insertion shape complementary to a cross-section of the tubular member in a proximal end portion.

8. The device according to claim 7, wherein an inner wall of the neck further comprises at least one longitudinal rib along the main axis configured to prevent rotation of the member around the main axis.

9. The device according to claim 1, wherein the distal end portion comprises a circumferential groove for receiving an O-ring seal.

10. The device according to claim 9, wherein the stopper of the distal end portion has a circumferential flange demarcating elements for gripping and handling the cap.

11. The device according to claim 1, wherein the member has a stop in a proximal end portion designed to engage with an internal raised portion of the tank to prevent the member from detaching from the neck when it has finished sliding towards the distal position.

12. The device according to claim 1, wherein the body of the member is produced by moulding synthetic material in a single piece.

13. The motor vehicle comprising the device according to claim 1, wherein the device is configured to be accessed from a hatch mounted on a peripheral body structure so that the device is configured to be accessed from an outside of the peripheral body structure.

* * * * *